(12) United States Patent
Byoun et al.

(10) Patent No.: US 10,176,835 B1
(45) Date of Patent: Jan. 8, 2019

(54) DATA STORAGE DEVICE EMPLOYING PREDICTIVE OVERSAMPLING FOR SERVO CONTROL

(71) Applicant: Western Digital Technologies, Inc., San Jose, CA (US)

(72) Inventors: Jaesoo Byoun, Irvine, CA (US); Masahito Kobayashi, Newport Beach, CA (US); Timothy A. Ferris, Mission Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/015,606

(22) Filed: Jun. 22, 2018

(51) Int. Cl.
*G11B 5/54* (2006.01)
*G11B 5/596* (2006.01)
*G11B 20/10* (2006.01)

(52) U.S. Cl.
CPC .... *G11B 5/59627* (2013.01); *G11B 20/10037* (2013.01)

(58) Field of Classification Search
CPC .. G11B 5/09; G11B 5/00; G11B 5/035; G11B 5/02; G11B 5/52; G11B 19/00; G11B 5/54
USPC ............... 360/39, 55, 65, 67, 70, 69, 75
See application file for complete search history.

(56) References Cited

U.S. PATENT DOCUMENTS

| | | | |
|---|---|---|---|
| 4,389,540 A | 6/1983 | Nakamura et al. | |
| 6,304,843 B1 | 10/2001 | Choi et al. | |
| 6,560,056 B1 | 5/2003 | Ryan | |
| 7,065,486 B1 | 6/2006 | Thyssen | |
| 7,106,537 B1 | 9/2006 | Bennett | |
| 7,515,369 B2 * | 4/2009 | Sugawara | G11B 5/09 360/51 |
| 9,747,913 B2 | 8/2017 | Sung et al. | |
| 2004/0232868 A1 | 11/2004 | Sawtell et al. | |

* cited by examiner

*Primary Examiner* — Nabil Z Hindi

(57) ABSTRACT

A data storage device is disclosed comprising a disk comprising servo data, and an actuator configured to actuate a head over the disk. A servo controller is configured to generate digital control values at a first sample rate based on the servo data and transmit the digital control values over a serial interface to a driver circuit. The driver circuit is configured to generate predictive oversampled control values at a second sample rate higher than the first sample rate based on at least two of the digital control values received from the servo controller, apply the predictive oversampled control values to a digital-to-analog converter (DAC) to generate an analog control signal, and apply the analog control signal to the actuator.

25 Claims, 3 Drawing Sheets

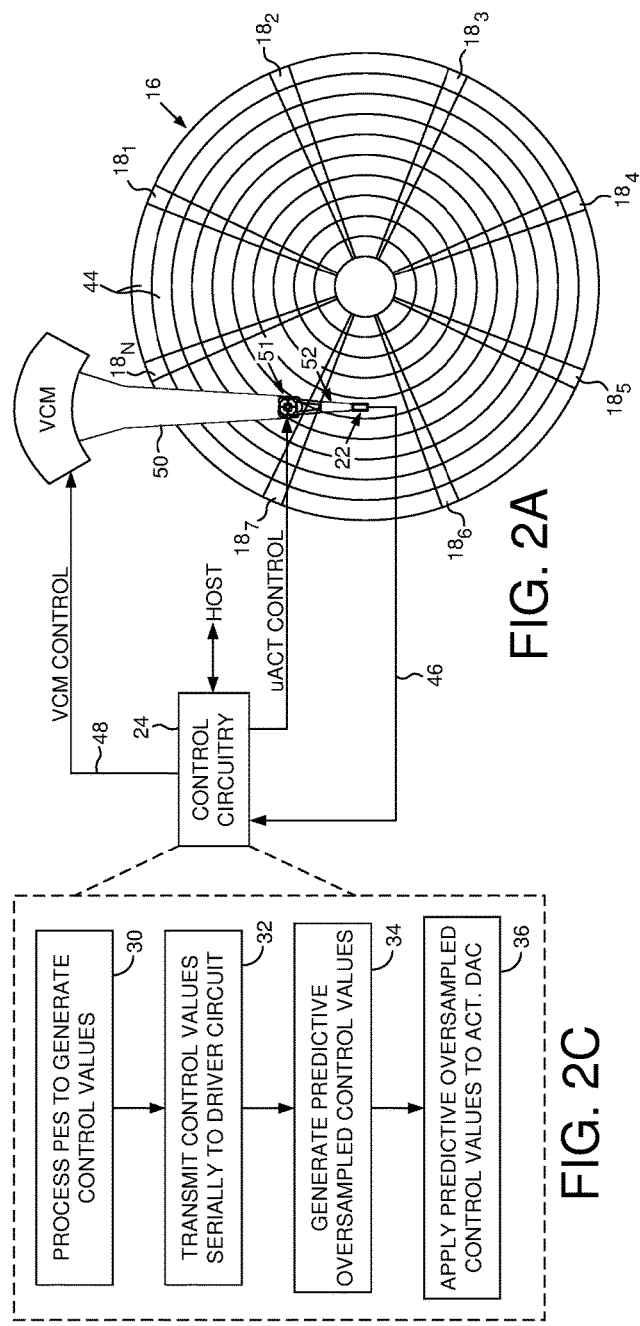
FIG. 2A
FIG. 2C
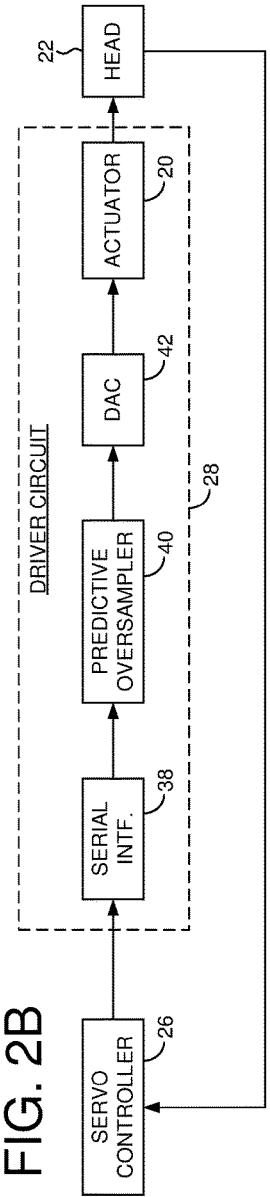
FIG. 2B

DATA STORAGE DEVICE EMPLOYING PREDICTIVE OVERSAMPLING FOR SERVO CONTROL

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A show a data storage device in the form of a disk drive according to an embodiment comprising a head actuated over a disk comprising servo data defining a plurality of servo tracks.

FIG. 2B shows control circuitry according to an embodiment comprising a servo controller configured to transmit digital control values to a driver circuit.

FIG. 2C is a flow diagram according to an embodiment wherein the driver circuit oversamples the digital control values using a predictive oversampler in order to mitigate the phase delay in the feedback loop caused by the transfer delay of the serial interface.

DETAILED DESCRIPTION

Figure 1:
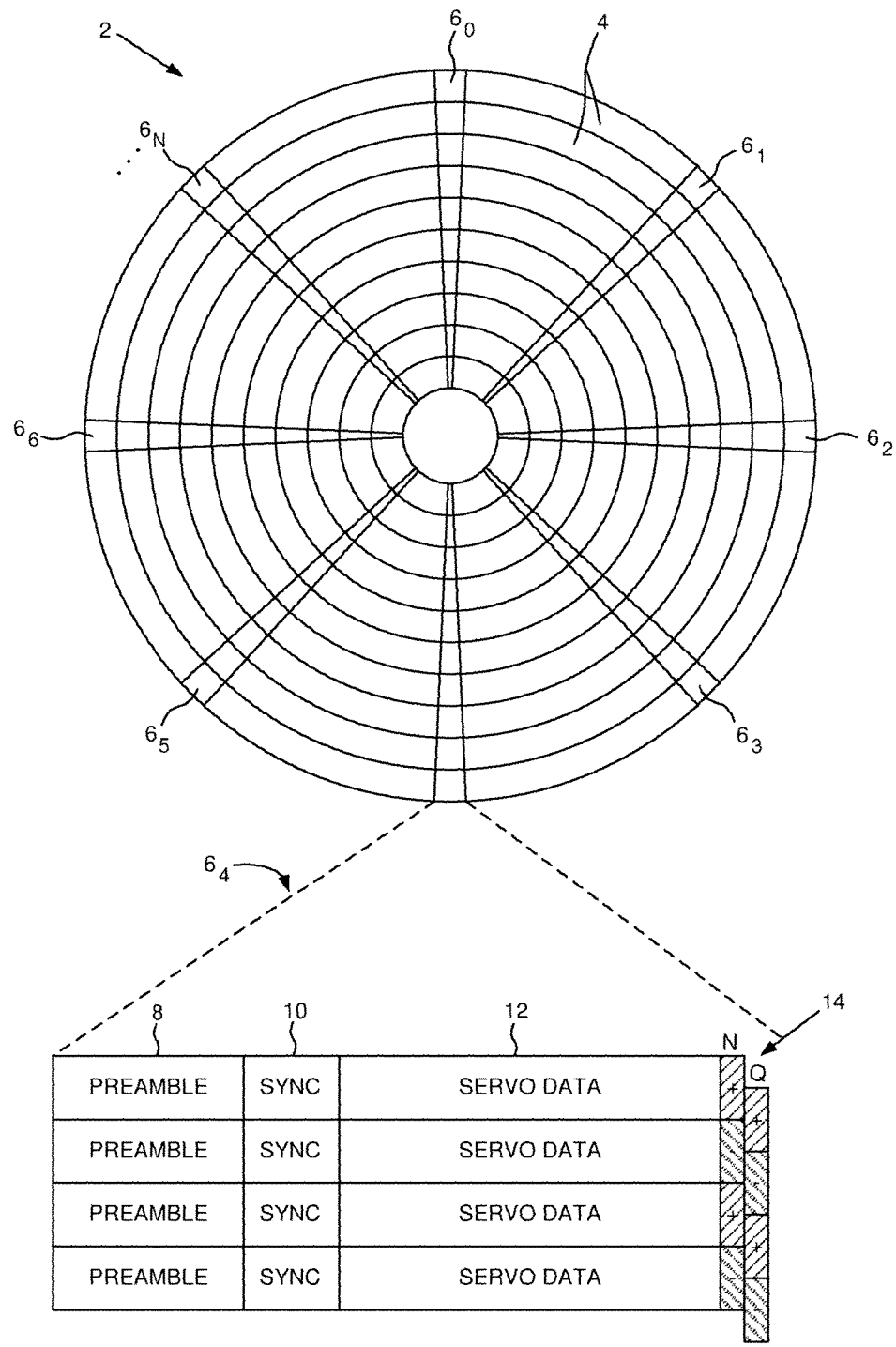
FIG. 1 shows a prior art disk format comprising a plurality of servo tracks defined by servo sectors.

FIGS. 2A and 2B show a data storage device in the form of a disk drive according to an embodiment comprising a disk 16 comprising servo data ($18_1$-$18_N$), and an actuator 20 configured to actuate a head 22 over the disk 16. The disk drive further comprises control circuitry 24 comprising a servo controller 26 and a driver circuit 28. The control circuitry 24 is configured to execute the flow diagram of FIG. 2C, wherein the servo controller 26 generates digital control values at a first sample rate based on the servo data (block 30), and transmits the digital control values over a serial interface 38 to the driver circuit (block 32). The driver circuit 28 is configured to generate predictive oversampled control values at a second sample rate higher than the first sample rate based on at least two of the digital control values received from the servo controller (block 34), and apply the predictive oversampled control values to a digital-to-analog converter (DAC) 42 to generate an analog control signal applied to the actuator (block 36).

In the embodiment of FIG. 2A, the servo data on the disk 16 comprises a plurality of servo sectors $18_1$-$18_N$ that define a plurality of servo tracks 44, wherein data tracks are defined relative to the servo tracks at the same or different radial density. The control circuitry 24 processes a read signal 46 emanating from the head 22 to demodulate the servo sectors $18_1$-$18_N$ and generate a position error signal (PES) representing an error between the actual position of the head and a target position relative to a target track. The control circuitry 24 process the PES to generate an analog control signal 48 applied to a voice coil motor (VCM) which rotates an actuator arm 50 about a pivot in order to actuate the head radially over the disk in a direction that reduces the PES. In one embodiment, the head 22 may be actuated over disk based on the PES using one or more secondary actuators (microactuators), for example, a microactuator 51 that actuates a suspension 52 for coupling a head slider to the actuator arm 50, or a microactuator that actuates the head slider relative to the suspension 52 (e.g., using a thermal actuator, piezoelectric actuator, etc.). The servo sectors $18_1$-$18_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In the embodiment of FIG. 2B, the servo controller 26 (which processes the PES to generate the digital control values) is implemented within a first integrated circuit, and the driver circuit 28 is implemented within a second integrated circuit. In order to reduce the cost of the disk drive, the digital control values are transmitted to the driver circuit 28 over a serial interface 38 that may also be used to transmit other configuration data (e.g., spindle motor control data). In one embodiment, the transfer delay of the serial interface 38 adds to the phase delay in the feedback loop of the servo control system that can degrade the servoing performance of the head. In order to mitigate the phase delay induced by the serial interface 38, in one embodiment the driver circuit 28 comprises a predictive oversampler 40 which generates predictive oversampled control values based on at least two values of the digital control values received from the servo controller 26.

Figure 3A:
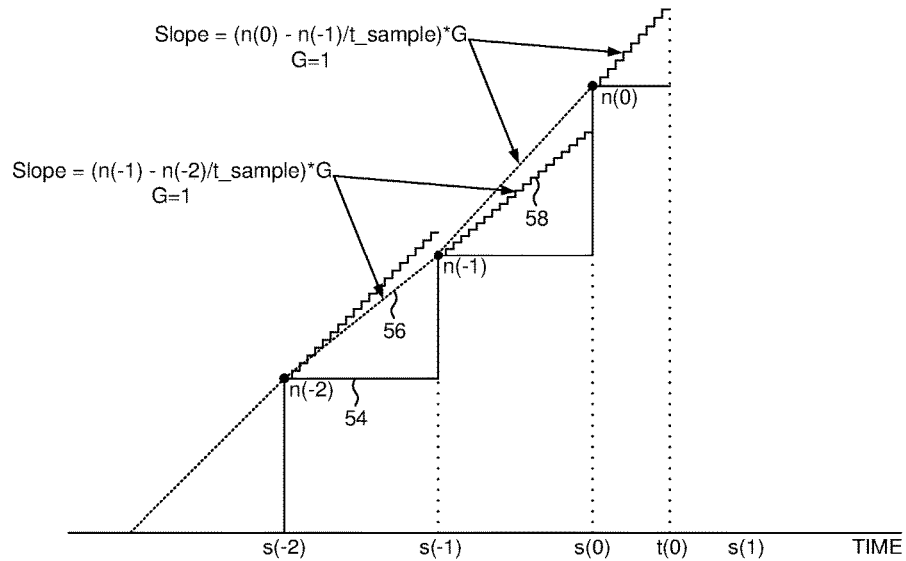
FIG. 3A illustrates an embodiment wherein the predictive oversampler generates predictive oversampled control values based on a slope of at least two values of the digital control values received from the servo controller.

FIG. 3A shows an example operation of the predictive oversampler 40 wherein the staircase signal 54 represents the digital control values n(x) generated by the servo controller 26 and transmitted over the serial interface 38 to the driver circuit 28. In one embodiment, the sample rate s(x) of the digital control values n(x) corresponds to the servo sample rate of the servo sectors $18_1$-$18_N$. That is, a digital control value n(x) is generated each time the head 22 reads a servo sector $18_i$, and then transmitted over the serial interface 38 to the driver circuit 28. In one embodiment, the predictive oversampler 40 generates the predictive oversampled control values based on at least two sequential values n(x) of the digital control signal. For example, in one embodiment the predictive oversampled control values are generated based on:

$$n(0)+f(n(0),n(-1))$$

where n(0) represents a current value of the digital control values, n(−1) represents a previous value of the digital control values, and f(n(0),n(−1)) represents a function of n(0) and n(−1). In one embodiment, the function f(n(0),n(−1)) computes a slope of n(0) and n(−1) which is scaled by a scalar G:

$$\text{Slope}=(n(0)-n(-1))*G$$

Referring again to FIG. 3A, at time s(−1) the driver circuit 28 computes the slope of the current and previous digital control values n(−1) and n(−2) represented by line 56 (where the scalar G in this example is unity). The slope 56 is then used to generate the predictive oversampled control values between servo sample time s(−1) and s(0) as represented by the staircase signal 58. That is, the staircase signal 58 of predictive oversampled control values is generated during the servo sample interval between s(−1) and s(0) along a slope that corresponds to the two previous digital control values received from the servo controller 26. At servo sample time s(0), a new digital control value n(0) is received and the predictive oversampled control values generated during the servo sample interval between s(0) and s(1) based on the slope of the two digital control values n(0) and n(−1). Time t(0) in FIG. 3A represents the current time during the servo sample interval when the head is between consecutive servo sectors.

The predictive oversampled control values may be generated at any suitable sample rate resulting in a corresponding number of steps in the staircase signals such as shown in the example of FIG. 3A. In one embodiment, a servo clock may be synchronized to the data rate of the servo data recorded within the servo sectors so that the servo clock may be used to sample the read signal at the servo data rate in order to demodulate the servo sectors. In one embodiment, the predictive oversampled control values may be generated based on the servo clock, such as by generating a predictive oversampled control value at every m cycles of the servo clock. In this manner, the number of predictive oversampled control values (staircase steps) generated between each servo sector is substantially constant.

Figure 3B:
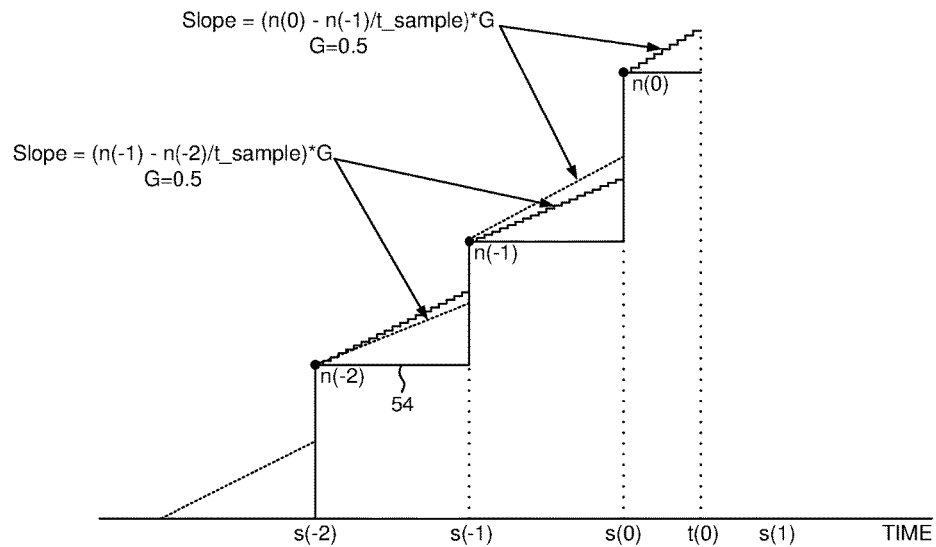
FIG. 3B illustrates an embodiment wherein the predictive oversampler generates predictive oversampled control values by scaling the slope computed from the values of previously received digital control values.

In one embodiment, the scalar G for scaling the slope of the received digital control values as described above may be configured to any suitable value that optimizes the prediction of the next digital control value. In one embodiment, configuring the scalar G to less than one improves the prediction accuracy, and in one embodiment, configuring the scalar to approximately 0.5 results in an optimal prediction accuracy. That is, configuring the scalar to 0.5 means the predicted value of the next digital control value received from the servo controller 26 will likely be on average near half the value of the previous step in the staircase signal 54. This embodiment is illustrated in FIG. 3B wherein the staircase signal representing the predictive oversampled control values generated between the servo sectors have slopes half those shown in FIG. 3A due to the scalar G being configured to 0.5.

In one embodiment, the scalar G may be adapted, for example, based on any suitable statistical analysis of the previously received digital control values. For example, in one embodiment the scalar G may be increased as the variance in the step size of the digital control values decreases toward zero. In one embodiment, the variance in the step size may increase due to a vibration disturbing the disk drive, and therefore decreasing the scalar G may attenuate the error induced in the predictive oversampled control values. In another embodiment, the scalar G may be adapted (increased/decreased) based on the average of the error between the predicted value and the actual value of the digital control values. In yet another embodiment, the slew rate of the predictive oversampled control values may be limited, for example, by limiting the maximum slope computed from the previously received digital control values.

In one embodiment, the scalar G may be adjusted based on whether the disk drive is performing a seek operation to seek the head to a target track, or a tracking operation to maintain the head over the target track during an access operation. For example, in one embodiment the scalar G may be increased during a tracking operation due to the decrease in the step size of the digital control values. In one embodiment, the scalar G may be adjusted based on a phase of a seek operation, such as having different scalar values during an acceleration phase, constant velocity phase, and deceleration phase.

The predictive oversampled control values may be generated based on any suitable function of the previously received digital control values, such as the linear prediction algorithm described above, or any other suitable linear prediction algorithm. In other embodiments, the digital control values may be processed using any suitable curve fitting techniques in order to extrapolate to the next most likely digital control value that will be received next from the servo controller 26.

Although the embodiments described above involve a servo control system for actuating a head over a disk in a data storage device, the disclosed concepts may be employed in any suitable servo control system utilizing a serial interface for communicating digital control values between integrated circuits. For example, the above described concepts may be employed in servo control systems used in industrial applications (e.g., robotics, automotive, aeronautics, medical, manufacturing, etc.) or consumer applications (e.g., appliances, toys, cameras, etc.).

Any suitable control circuitry may be employed to implement the flow diagrams in the above embodiments, such as any suitable integrated circuit or circuits. For example, in the embodiment of FIG. 2B the servo controller 26 may be implemented in a disk controller integrated circuit responsible for implementing various firmware operating aspects of the disk drive, whereas the driver circuit 28 may be implemented in a power integrated circuit responsible for controlling power operations of the disk drive, such as controlling the head actuator(s) and a spindle motor configured to rotate the disk(s).

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored in a non-volatile storage medium (NVSM) and read into a volatile semiconductor memory when the data storage device is powered on. In yet another embodiment, the control circuitry comprises suitable logic circuitry, such as state machine circuitry.

In various embodiments described above, a disk drive may include a magnetic disk drive, an optical disk drive, a hybrid drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising servo data;
   a head;
   an actuator configured to actuate the head over the disk; and
   control circuitry comprising a servo controller and a driver circuit, wherein the servo controller is configured to generate digital control values at a first sample rate based on the servo data and transmit the digital control values over a serial interface to the driver circuit, wherein the driver circuit is configured to:
   generate predictive oversampled control values at a second sample rate higher than the first sample rate based on at least two of the digital control values received from the servo controller;
   apply the predictive oversampled control values to a digital-to-analog converter (DAC) to generate an analog control signal; and
   apply the analog control signal to the actuator.

2. The data storage device as recited in claim 1, wherein the driver circuit is configured to generate the predictive oversampled control values based on:

$$n(0)+f(n(0),n(-1))$$

where $n(0)$ represents a current digital control value, $n(-1)$ represents a previous digital control value, and $f(n(0),n(-1))$ represents a function of $n(0)$ and $n(-1)$.

3. The data storage device as recited in claim 2, wherein $f(n(0),n(-1))$ computes a slope of $n(0)$ and $n(-1)$.

4. The data storage device as recited in claim 3, wherein $f(n(0),n(-1))$ computes:

$$(n(0)-n(-1))*G$$

where G is a predetermined scalar.

5. The data storage device as recited in claim 4, wherein G is less than one.

6. The data storage device as recited in claim 5, wherein G is approximately 0.5.

7. A method of operating a data storage device, the method comprising:
   receiving digital control values over a serial interface;
   generating predictive oversampled control values based on at least two of the digital control values;
   applying the predictive oversampled control values to a digital-to-analog converter (DAC) to generate an analog control signal; and
   applying the analog control signal to an actuator configured to actuate a head over a disk.

8. The method as recited in claim 7, further comprising generating the predictive oversampled control values based on:

$$n(0)+f(n(0),n(-1))$$

where $n(0)$ represents a current digital control value, $n(-1)$ represents a previous digital control value, and $f(n(0),n(-1))$ represents a function of $n(0)$ and $n(-1)$.

9. The method as recited in claim 8, wherein $f(n(0),n(-1))$ computes a slope of $n(0)$ and $n(-1)$.

10. The method as recited in claim 9, wherein $f(n(0),n(-1))$ computes:

$$(n(0)-n(-1))*G$$

where G is a predetermined scalar.

11. The method as recited in claim 10, wherein G is less than one.

12. The method as recited in claim 11, wherein G is approximately 0.5.

13. Control circuitry configured to:
    receive digital control values over a serial interface;
    generate predictive oversampled control values based on at least two of the digital control values;
    apply the predictive oversampled control values to a digital-to-analog converter (DAC) to generate an analog control signal; and
    apply the analog control signal to an actuator.

14. The control circuitry as recited in claim 13, wherein the control circuitry is configured to generate the predictive oversampled control values based on:

$$n(0)+f(n(0),n(-1))$$

where $n(0)$ represents a current digital control value, $n(-1)$ represents a previous digital control value, and $f(n(0),n(-1))$ represents a function of $n(0)$ and $n(-1)$.

15. The control circuitry as recited in claim 14, wherein $f(n(0),n(-1))$ computes a slope of $n(0)$ and $n(-1)$.

16. The control circuitry as recited in claim 15, wherein $f(n(0),n(-1))$ computes:

$$(n(0)-n(-1))*G$$

where G is a predetermined scalar.

17. The control circuitry as recited in claim 16, wherein G is less than one.

18. The control circuitry as recited in claim 17, wherein G is approximately 0.5.

19. The control circuitry as recited in claim 13, wherein the actuator is configured to actuate a head over a disk.

20. A device comprising:
a mechanical component;
an actuator configured to actuate the mechanical component; and
control circuitry comprising a servo controller and a driver circuit, wherein the servo controller is configured to generate digital control values at a first sample rate and transmit the digital control values over a serial interface to the driver circuit, wherein the driver circuit is configured to:
generate predictive oversampled control values at a second sample rate higher than the first sample rate based on at least two of the digital control values received from the servo controller;
apply the predictive oversampled control values to a digital-to-analog converter (DAC) to generate an analog control signal; and
apply the analog control signal to the actuator.

21. The device as recited in claim 20, wherein the driver circuit is configured to generate the predictive oversampled control values based on:

$$n(0)+f(n(0),n(-1))$$

where n(0) represents a current digital control value, n(−1) represents a previous digital control value, and f(n(0),n(−1)) represents a function of n(0) and n(−1).

22. The device as recited in claim 21, wherein f(n(0),n(−1)) computes a slope of n(0) and n(−1).

23. The device as recited in claim 22, wherein f(n(0),n(−1)) computes:

$$(n(0)-n(-1))*G$$

where G is a predetermined scalar.

24. The device as recited in claim 23, wherein G is less than one.

25. The device as recited in claim 24, wherein G is approximately 0.5.

* * * * *